United States Patent [19]

Morimura et al.

[11] Patent Number: 5,317,685
[45] Date of Patent: May 31, 1994

[54] MOTION VECTOR DETECTING APPARATUS AND IMAGE STABILIZER INCLUDING THE SAME

[75] Inventors: Atsushi Morimura, Nara; Kenya Uomori, Katano, both of Japan

[73] Assignee: Matsushita Electric Industrial Co., Ltd., Tokyo, Japan

[21] Appl. No.: 703,773

[22] Filed: May 21, 1991

[30] Foreign Application Priority Data

May 21, 1990 [JP] Japan ............................ 2-130676
May 23, 1990 [JP] Japan ............................ 2-133360

[51] Int. Cl.⁵ .................................... G06F 15/00
[52] U.S. Cl. ............................. 395/152; 395/161
[58] Field of Search ............ 395/152, 153, 154, 155, 395/161; 340/723, 724, 706

[56] References Cited

FOREIGN PATENT DOCUMENTS

0348207A2  6/1989  European Pat. Off. .
0348207    12/1989 European Pat. Off. .
0366136    5/1990  European Pat. Off. .
60-110915  5/1985  Japan .
2187913    9/1987  United Kingdom .

OTHER PUBLICATIONS

Patent Abstracts of Japan, vol. 11, No. 122 (E-500)[2569], Apr. 16, 1987.

Primary Examiner—Phu K. Nguyen

[57] ABSTRACT

A motion vector detector divides an image of an inputted image signal into a plurality of regions so as to calculate motion vectors at the regions, respectively, a characteristics detector then detects characteristics of the motion vectors, or of calculation data of the motion vectors, so as to detect a state in which a number of points having close correlation exist in the image, a vector control and decision unit then determines, when the characteristics detector has detected the state, some of the motion vectors at one of the regions free from the state so as to select a motion vector of the image signal from the some of the motion vectors by neglecting the remaining motion vectors at the remaining regions in the state, an image stabilizer may then be used to correct sway of an outputted image.

6 Claims, 12 Drawing Sheets

MOTION VECTOR DETECTING APPARATUS AND IMAGE STABILIZER INCLUDING THE SAME

BACKGROUND OF THE INVENTION

The present invention relates to a motion vector detecting apparatus for detecting an amount of displacement of an image and an image stabilizer for correcting sway of an outputted image, which includes the motion vector detecting apparatus.

Figure 1:
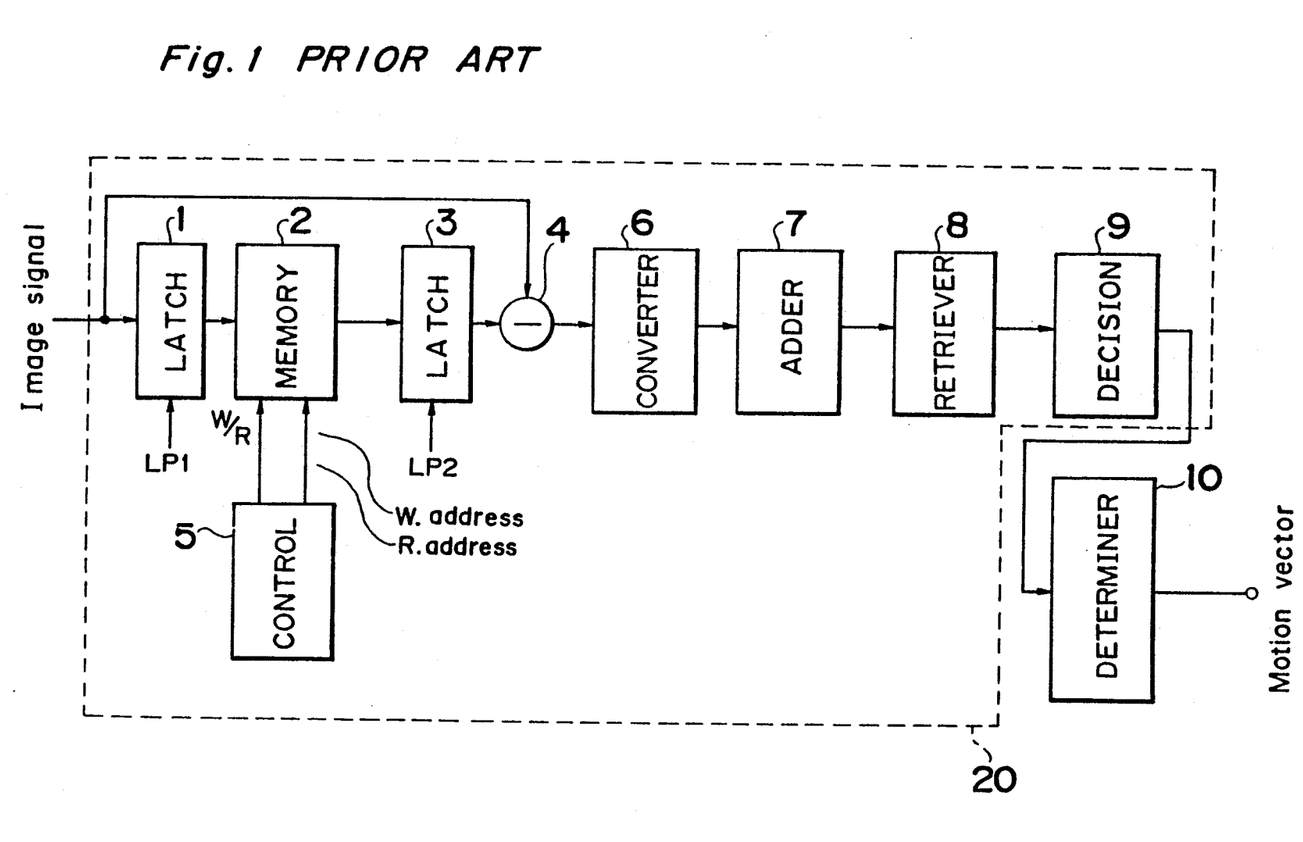
FIG. 1 is a block diagram of a prior art motion vector detecting apparatus (already referred to)

A motion vector detecting apparatus is known from, for example, Japanese Patent Laid-Open Publication No. 61-269475. As shown in FIG. 1, the known motion vector detecting apparatus includes a motion vector detector 20 and a motion vector determiner 10. The motion vector detector 20 includes a first latch 1, a representative point memory 2, a second latch 3, a subtracter 4, an address controller 5, an absolute value converter 6, an accumulative adder 7, a correlational retriever 8 and a correlational decision unit 9 for judging validity of correlation in an image.

Figure 2A:
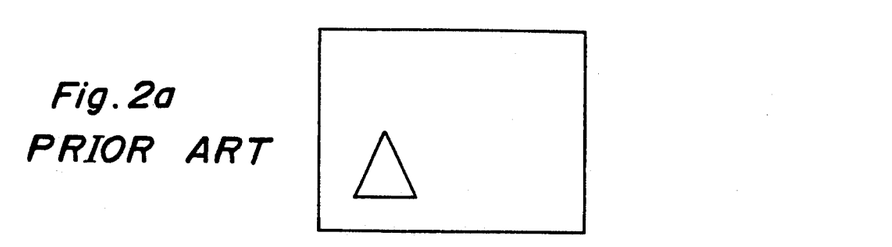
FIGS. 2a to 2c are views explanatory of a motion vector of an image (already referred to)
Figure 2B:
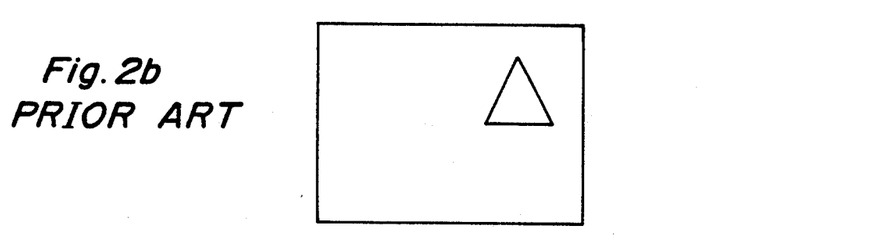
Figure 2C:
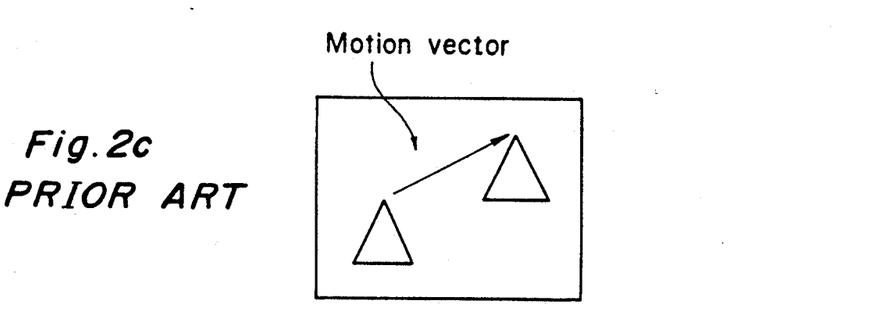

The known vector detecting apparatus of the above described below arrangement is further described. Initially, a motion vector of an image is described with reference to FIGS. 2a to 2c. FIG. 2a shows an image at a time point and FIG. 2b shows an image subsequent to the image of FIG. 2a by one field or one frame. When the image is displaced in parallel by movement of an image pickup device, etc. as shown in FIGS. 2a and 2b, an amount of parallel displacement of the image is expressed by a vector of the arrow in FIG. 2c and this vector is referred to as a "motion vector".

Figure 3:
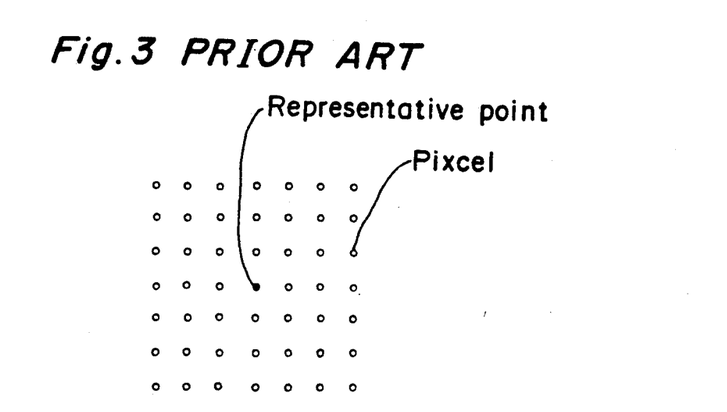
FIG. 3 is a view explanatory of a representative point and pixcels surrounding the representative point (already referred to)

FIG. 3 shows a representative point and pixcels surrounding the representative point in a so-called representative point matching method of detecting a motion vector of an image. In this method, image data is disposed at a representative point in a field and a motion vector is detected by performing correlational arithmetic operations for determining to which one of the surrounding pixcels the image data is displaced in the next field.

Operation of the known motion vector detecting apparatus employing the correlational arithmetic unit is described with reference to FIG. 1. Image data at respective representative points in a screen are received by the first latch 1 in response to a timing pulse LP1 and are, at a certain timing, written at addresses of the representative point memory 2, which correspond to the representative points, respectively. Subsequently, in the next field or the next frame, correlation, namely absolute values of differences between image data in a motion vector detecting area surrounding each representative point and image data of the representative points of the previous field, which are stored in the representative point memory 2, are obtained and are inputted to the accumulative adder 7. Data representing correlation obtained on the basis of coordinates of each representative point are accumulatively added by the accumulative adder 6. When accumulative addition of the data for all the representative points has been completed, a location having the closest correlational value among accumulative sums stored in the accumulative adder 7 is judged by the correlational retriever 8. Namely, the location (address) having the closest correlational value relative to the corresponding representative point indicates the motion vector.

In the arrangement shown in FIG. 1, correlational arithmetic operation is performed by accumulative addition of the absolute values of the differences. Thus, in the accumulative adder 7, data at points having quite close correlation assume values smaller than those at other points. Furthermore, on the basis of distributions (average value, minimum value, gradient, etc.) of the correlational values in the motion vector detecting area, the correlational decision unit 9 judges whether or not the motion vector obtained by the correlational arithmetic operation is valid. When (1) the average value is small, (2) the minimum value is large and (3) the gradient around the minimum point of the correlational value is small, the correlational decision unit 9 judges that the motion vector obtained by the correlational arithmetic operation is invalid.

The above operation is performed for image signals in each of a plurality of divided regions in a screen. Then, on the basis of the motion vectors obtained from the image signals in the respective regions in the screen and data on judgement of validity of the motion vectors by the correlational decision unit 9, the motion vector determiner 10 determines a motion vector of the image signals of the whole screen.

Since the above described operation is performed for each field (frame), the first latch 1 is provided for storing, while the correlational arithmetic operation is being performed, image data at the representative points for the correlational arithmetic operation in the next field (frame). Meanwhile, when correlation between image data at a representative point and image data surrounding the representative point is obtained, the second latch 3 stores the image data at the representative point.

In the known motion vector detecting apparatus of the above described arrangement, when correlation at respective locations of a subject is remote and only a point of shift of the image through movement of an image pickup device has close correlation, no problem is incurred. However, if a subject has regular correlation, the following problem arises. Namely, in this case, a number of points of the subject have close correlation. Thus, in order to detect the motion vector accurately, a gradient around a minimum value of the correlational values is checked but validity of the correlation cannot be judged by merely comparing the gradient with a constant. Meanwhile, when a camera shooting the subject is swaying, the gradient varies greatly, so that validity of the correlation cannot be judged sufficiently.

Thus, judgement based on the gradient does not necessarily ensure judgement of validity of the correlation positively in many cases. Hence, the motion vectors obtained from the respective regions assume positions, which have close correlation in the image but are irrelevant to the proper motion vectors at the respective regions, and thus, do not represent the proper motion vectors at the respective regions. As a result, if the motion vector of the whole screen is determined by taking, for example, an average of the motion vectors at the respective regions, the motion vector of the whole screen is detected erroneously due to a prospective motion vector obtained by the mere gradient in a region having close correlation in the image, which correlation is different from movement of the whole screen.

SUMMARY OF THE INVENTION

Accordingly, an essential object of the present invention is to provide a motion vector detecting apparatus which detects, when a number of points of a subject have close correlation especially in a specific direction such as horizontal direction or vertical direction, the correlation and determines a motion vector of a whole screen without using motion vectors detected under conditions leading to increase of detection error of the motion vectors such that detection error of the motion vector of the whole screen is suppressed.

Another important object of the present invention is to provide a motion vector detecting apparatus which detects conditions where a number of points of a subject have close correlation and motion vectors obtained at respective regions change sharply at random under the above conditions and which reduces the motion vectors obtained under conditions leading to increase of detection error of the motion vectors such that detection error of a motion vector of a whole screen is suppressed.

Still another object of the present invention is to provide an image stabilizer for correcting sway of an outputted image, which shifts an image in a direction opposite to that of the motion vector detected by the motion vector detecting apparatus so as to suppress correction error of sway of the outputted image such that sway of the outputted image is stabilized.

In order to accomplish these objects of the present invention, a motion vector detecting apparatus according to a first embodiment of the present invention comprises: a motion vector detector which divides an image of an inputted image signal into a plurality of regions so as to calculate motion vectors at the regions, respectively; a characteristics detector for detecting characteristics of the motion vectors or of calculation data of the motion vectors so as to detect whether or not a ratio of gradients at points having close correlation in the image falls in a predetermined range; and a vector control and decision unit which controls magnitudes of the motion vectors by an output of said characteristics detector and determines, when said characteristics detector has detected the state, one of the motion vectors at one of the regions free from the state as a motion vector of the image signal by neglecting the remaining motion vectors at the remaining regions in the state.

Furthermore, in a second embodiment of the present invention, said characteristics detector detects characteristics that on of the motion vectors changes at random in one of the regions when a number of points having close correlation exist in the image, such that said vector control and decision unit reduces, when said characteristics detector has detected the characteristics in the one of the regions, the magnitude of the one of the motion vectors.

By the above described arrangement of the first embodiment of the present invention, validity of the motion vectors at the respective detection regions is judged by using ratios of gradients at points having close correlation, which are detected by the characteristics detector. If the gradient ratios exceed predetermined ranges, the motion vector of the whole screen is determined without using the motion vectors obtained from the regions having the gradient ratios exceeding the predetermined ranges such that erroneous detection of the motion vector of the whole screen is eliminated.

Meanwhile, by the above mentioned arrangement of the second embodiment of the present invention, the characteristics detector detects the conditions that a number of points of a subject have close correlation and the obtained motion vectors change sharply. If the conditions have been detected, the motion vector of the whole screen is obtained by suppressing the motion vectors obtained from the regions satisfying the conditions such that erroneous detection of the motion vector of the whole screen is eliminated.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
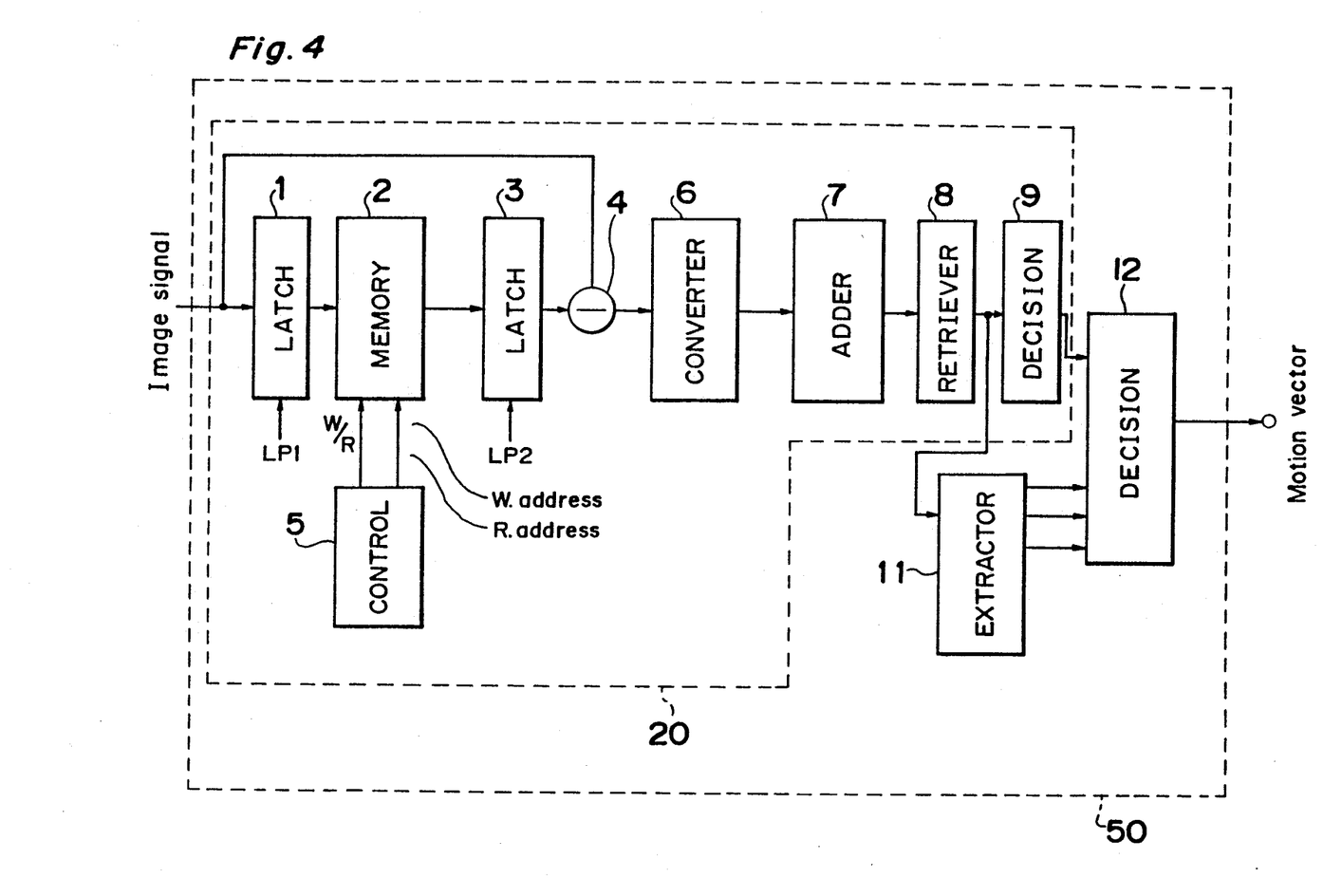
FIG. 4 is a block diagram of a motion vector detecting apparatus according to a first embodiment of the present invention.

Referring now to the drawings, there is shown in FIG. 4, a motion vector detecting apparatus 50 according to a first embodiment of the present invention. The motion vector detecting apparatus 50 includes a motion vector detector 20, a correlational characteristics extractor 11 and a motion vector decision unit 12. In the same manner as a prior art motion vector detecting apparatus of FIG. 1, the motion vector detector 20 includes a first latch 1, a representative point memory 2, a second latch 3, a subtracter 4, an address controller 5, an absolute converter 6, an accumulative adder 7, a correlational retriever 8 and a correlational decision unit 9 for judging validity of correlation in an image. In inputted signals, image data at respective representative points on a screen are received by the first latch 1 in response to a timing pulse LP1 and are, at a certain timing, written at addresses of the representative point memory 2, which correspond to the representative points, respectively. Subsequently, in the next field or the next frame, correlation between image data in a motion vector detecting area surrounding each representative point and image data at each representative point of the previous field is obtained and is inputted to the accumulative adder 7 in which a correlational arithmetic operation is performed by accumulative addition of absolute values of differences between the image data. Data representing the correlation at a location of identical coordinates relative to each representative point is accumulatively added by the accumulative adder 7. When accumulative addition of the data around all the representative points has been completed, location of a minimum value of the accumulative sums stored by the accumulative adder 7 is judged by the correlational retriever 8. Namely, the location (address) of the minimum accumulative sum relative to the location of the corresponding representative point indicates the motion vector.

Figure 5A:
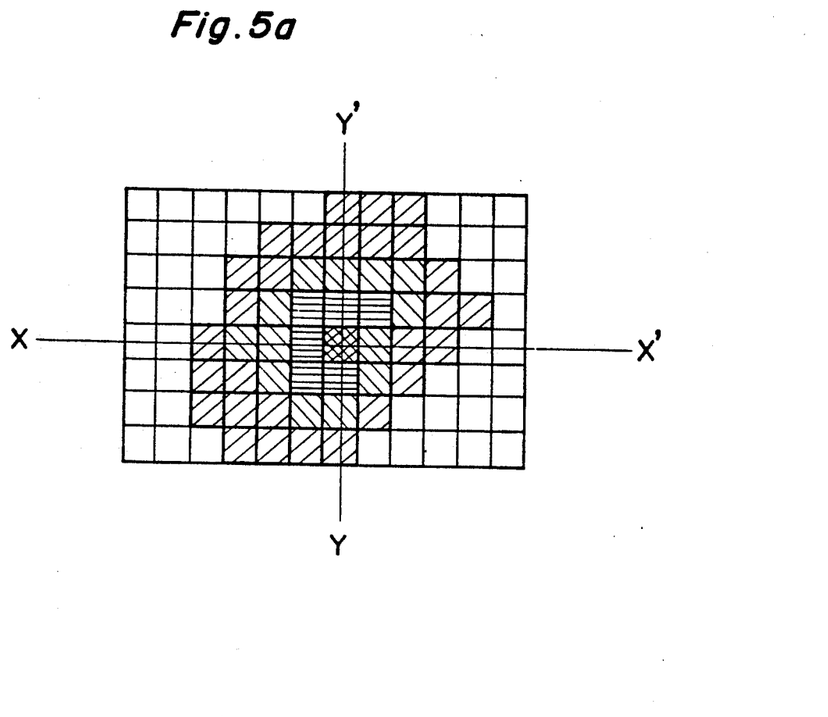
FIGS. 5a and 5b are schematic views explanatory of operation of the motion vector detecting apparatus of FIG. 4.
Figure 5B:
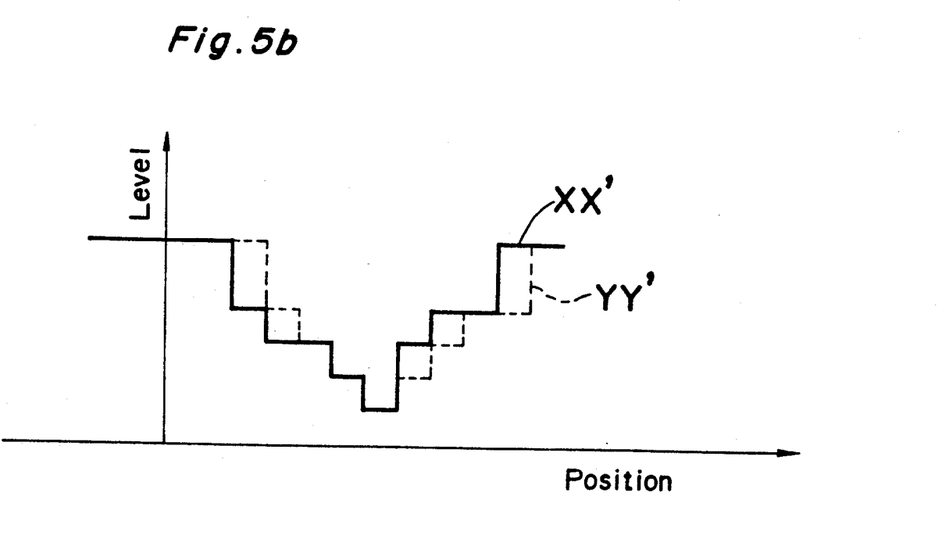

In the arrangement of the present invention, the correlational arithmetic operation is performed by accumulative addition of the absolute values of the differences between the image data as described above. Hence, data at a point having close correlation in the accumulative adder 7 assumes a level lower than those of data at other points. FIGS. 5a and 5b schematically show a portion of accumulative sums of general image signals in the motion vector detecting apparatus 50. In FIG. 5a, the abscissa X—X' represents horizontal direction, while the ordinate Y—Y' represents vertical direction. In FIG. 5a, density indicates data level and the data level becomes lower as the density comes closer to black. Data level at the location of the abscissa X—X' of FIG. 5a is shown in FIG. 5b. In FIG. 5b, the point having the lowest level indicates a point having close correlation and is obtained by the correlational retriever 8. Furthermore, on the basis of distributions (average value, minimum value, gradient, etc.) of correlational values in each motion vector detecting area, the correlational decision unit 9 judges whether or not a prospective motion vector obtained by the correlational retriever 8 in each motion vector detecting area is valid.

Figure 6:
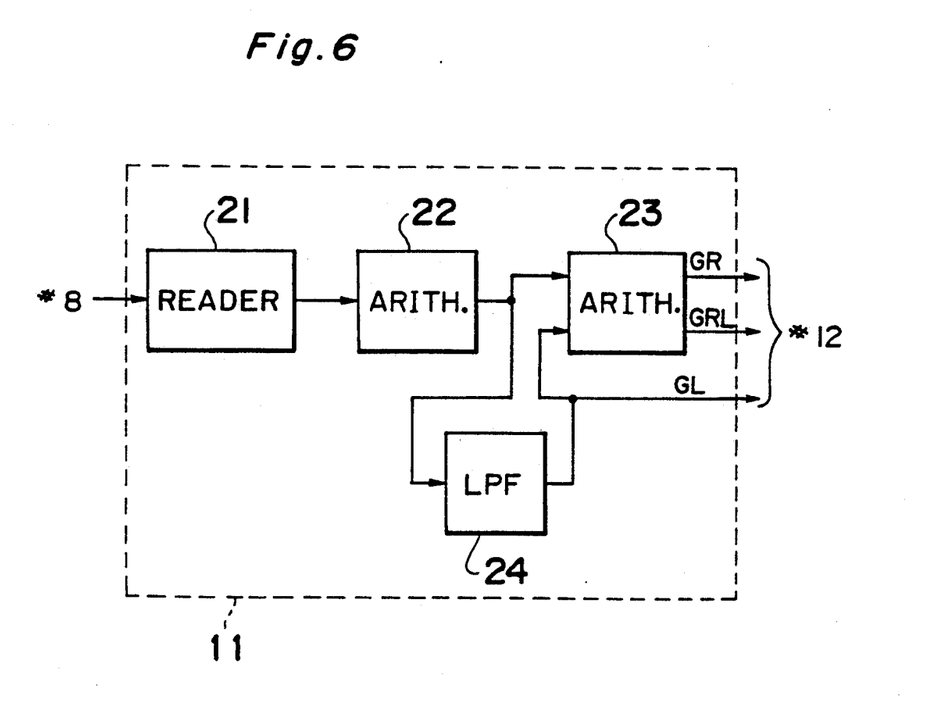
FIG. 6 is a block diagram of a correlational characteristics extractor employed in the motion vector detecting apparatus of FIG. 4.

Simultaneously with this judgement of validity, gradient in horizontal direction, gradient in vertical direction, gradients in two oblique directions intersecting at right angles, ratio of the gradients in horizontal and vertical directions and ratio of the gradients in the oblique directions are calculated by the correlational characteristics extractor 11. As shown in FIG. 6, the correlational characteristics extractor 11 includes a correlational value reader 21, a gradient arithmetic unit 22, a gradient ratio arithmetic unit 23 and a low-pass filter 24. A correlational value around a point of the prospective motion vector, which was obtained by the correlational retriever 8, is read by the correlational value reader 21. Then, the gradients in horizontal, vertical and oblique directions are calculated by the gradient arithmetic unit 22. Thereafter, the ratio of the gradients in horizontal and vertical directions and the ratio of the gradients in the oblique directions are calculated by the gradient ratio arithmetic unit 23. The gradient ratio arithmetic unit 23 performs two kinds of calculations of the gradient ratios, namely one calculation in which the gradients obtained by the gradient arithmetic unit 22 are directly calculated and the other calculation in which the gradients are passed through the low-pass filter 24 and then, are calculated. By passing the gradients through the low-pass filter 24, it becomes possible to form a judgement subjected to less noises.

Figure 7A:
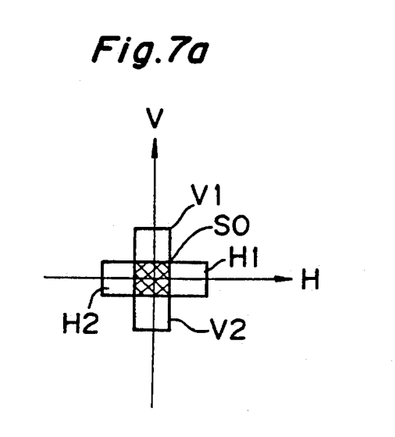
FIGS. 7a and 7b are views explanatory of the operation of the motion vector detecting apparatus of FIG. 4.
Figure 7B:
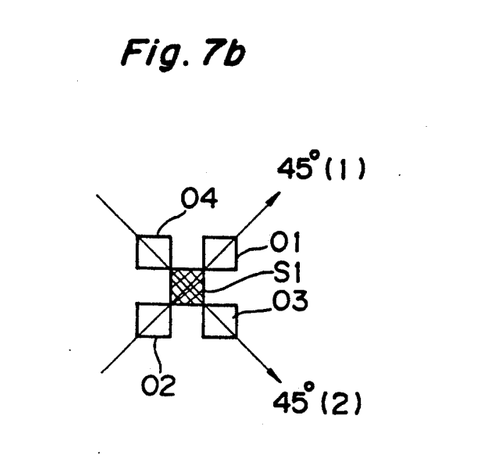

FIGS. 7a and 7b show combinations of the gradient ratios. FIG. 7a shows directions for judging the ratio of the gradients in horizontal and vertical directions, while FIG. 7b shows directions for judging the ratio of the gradients in the oblique directions. In FIGS. 7a and 7b, each square block corresponds to each correlational value and indicates one location where the correlational value is obtained and the central hatched square block shows the location having the closest correlation, i.e. having the lowest data level. Assuming that Gv and Gh denote the gradients in vertical and horizontal directions, which have been passed through the low-pass filter 24, respectively, while Go1 and Go2 denote the gradients in the oblique directions, which have been passed through the low-pass filter 24, respectively, the gradients Gv, Gh, Go1 and Go2 are expressed as follows.

$$Gv = \max.\{(LV1-LS0), (LV2-LS0)\}$$

$$Gh = \max.\{(LH1-LS0), (LH2-LS0)\}$$

$$Go1 = \max.\{(Lo1-So1), (Lo2-So1)\}$$

$$Go2 = \max.\{(Lo3-So1), (Lo4-So1)\}$$

In the above equations, a term max. {a, b} represents a maximum of a and b and LV1, etc. denote the correlational value of the square V1, etc. The gradient ratios are judged by the following equations (1) and (2).

$$4 > Gh/Gv > 0.8 \quad (1)$$

$$2 > Go1/Go2 > 0.5 \quad (2)$$

When it has been found through calculation of the gradient ratios by the correlational characteristics extractor 11 that the above equations (1) and (2) are established, the motion vector decision unit 12 judges that the obtained motion vector is valid.

By calculating the gradient ratios obtained under identical conditions, it becomes possible to cancel variable components of the gradients even when the gradients have varied due to displacement of an image caused by sway of a camera. Therefore, influence of variations of the gradients can be lessened, so that it becomes possible to stably detect conditions where erroneous vectors are likely to be produced.

Figure 8A:
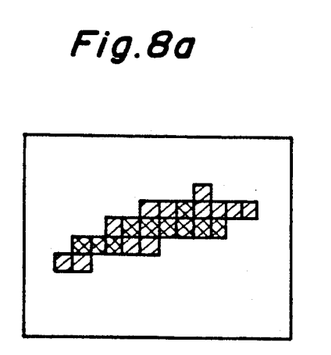
FIGS. 8a and 8b are schematic views showing correlational data having close correlation in specific directions in the motion vector detecting apparatus of FIG. 4.
Figure 8B:
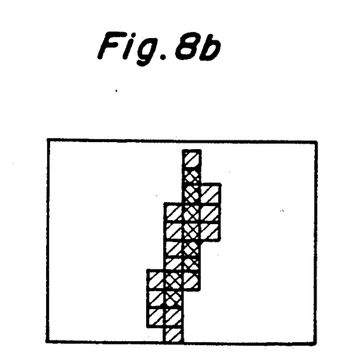

FIGS. 8a and 8b schematically show the conditions where erroneous vectors are likely to be produced. In FIGS. 8a and 8b, the calculated correlational values are expressed by darkness. When hatching becomes darker, correlation becomes closer, namely the correlational value becomes smaller. In FIGS. 8a and 8b, positions in two dimensions represent changes in correlational calculation and changes of points having close correlation, i.e. small correlational values are shown in a central portion of each of FIGS. 8a and 8b. FIG. 8a shows a case in which correlation is close in the horizontal direction, while FIG. 8b shows a case in which correlation is close in the vertical direction. In each of FIGS. 8a and 8b, the equation (1) is not established and thus, it is possible to detect the conditions where erroneous vectors are likely to be produced.

A signal GL obtained by passing the gradients through the low-pass filter 24, a signal GR obtained by calculating the gradient ratios without passing the gradients through the low-pass filter 24 and a signal GRL obtained by calculating the gradient ratios after passing the gradients through the low-pass filter 24 are applied to the motion vector decision unit 12. The motion vector decision unit 12 judges the signals GR and GR1 of the gradient ratios simultaneously. Furthermore, the motion vector decision unit 12 judges also the signal GL of the gradients. By passing the gradients through the low-pass filter 24, judgement of the motion vector decision unit 12 is subjected to less noises and thus, the motion vector decision unit 12 is capable of forming a judgement stably but response time becomes longer. Therefore, under conditions in which time lag poses a problem, priority for processing is given to the data having not been passed through the low-pass filter 24. On the contrary, under conditions in which time lag offers no problem, priority for processing is given to the data having been passed through the low-pass filter 24. Then, a decision is made as to whether or not the thus obtained motion vector can be used for correcting sway of an outputted image.

In the case where only gradient is detected a in prior art motion vector detecting apparatuses, the phenomena of FIGS. 8a and 8b cannot be detected stably, so that erroneous motion vectors are detected. However, in the present invention, erroneous detection of the motion vectors can be avoided even in the case of FIGS. 8a and 8b.

The above operation is performed for each of a plurality of divided regions in a screen. Since the above described operation is performed for each field (frame), the first latch 1 is provided for storing, while correlational arithmetic operation is being performed, image data at the representative points for correlational arithmetic operation in the next field (frame). Meanwhile, when correlation between image data at a representative point and image data surrounding the representative point is obtained, the second latch 3 stores the image data at the representative point.

Thus, prospective motion vectors are, respectively, determined in the divided regions of the screen. Then, these prospective motion vectors are passed through a median filter so as to be selected as a motion vector of an inputted signal. Thus, the motion vector of the inputted signal is obtained. Hence, under conditions where a number of points having close correlation in horizontal, vertical or oblique directions are obtained, the prospective motion vectors are regarded as being invalid and are not adopted as the motion vector of the inputted signal. Therefore, also in such a case associated with prior art motion vector detecting apparatuses that the prospective motion vectors are invalid as the motion vector of the inputted signal but an erroneous motion vector is outputted due to failure to form a judgement of invalidity, a judgement of invalidity can be formed accurately in the present invention and thus, the erroneous motion vector is not outputted.

Figure 9:
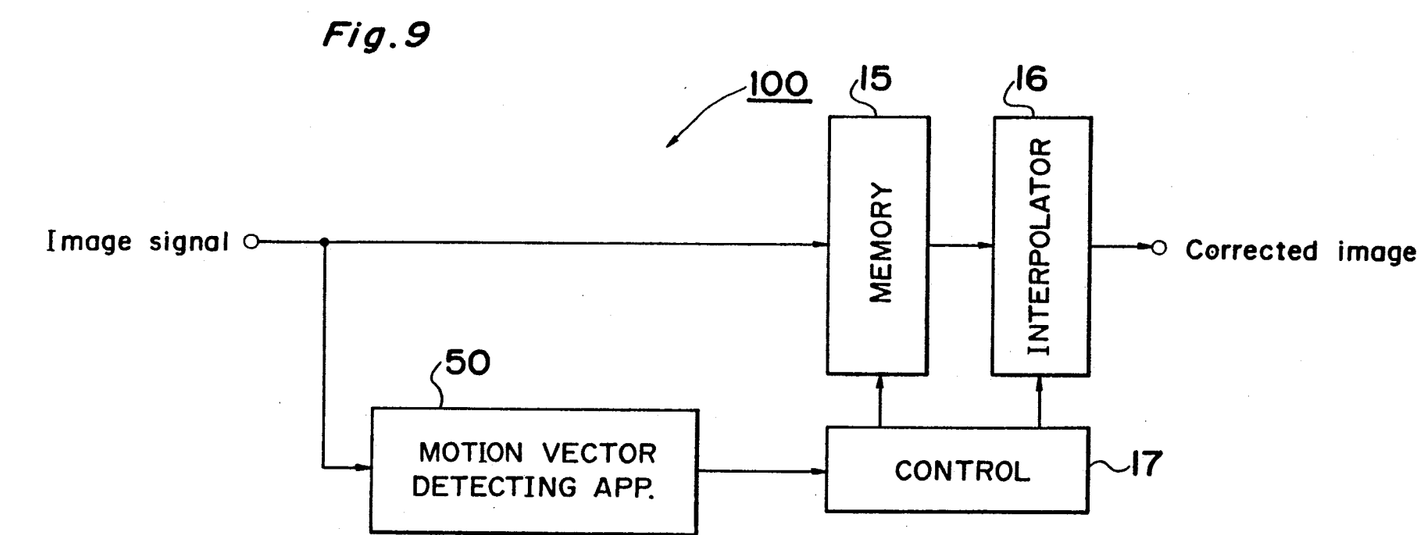
FIG. 9 is a block diagram of an image stabilizer including the motion vector detecting apparatus of FIG. 4, in another aspect of the present invention.

Hereinbelow, an image stabilizer 100 for correcting sway of an outputted image, in another aspect of the present invention is described with reference to FIG. 9. The image stabilizer 100 includes the motion vector detecting apparatus 50, a memory 15 for storing image signals, an interpolator 16 for interpolating signals of the memory 15 and an output controller 17 for controlling the memory 15 and the interpolator 16 on the basis of outputs of the motion vector detecting apparatus 50.

Operation of the image stabilizer 100 of the above described arrangement is described. In FIG. 9, since the motion vector is obtained in the same method as that of the first embodiment, a description thereof is abbreviated for the sake of brevity. A motion vector of an inputted image signal is outputted from the motion vector detecting apparatus 50 so as to be applied to the output controller 17. In the case where the motion vector is expressed by an address of the memory 15 in which the inputted image is stored, the address of signal read-out of the memory 15 is determined by the output controller 17 in accordance with an integral portion of the motion vector expressed by the address of the memory 15. Meanwhile, the output controller 17 controls the interpolator 16 in accordance with a decimal portion of the motion vector expressed by the address of the memory 15. The interpolator 16 performs linear interpolation in which multiplication of a weight corresponding to an inverse number of a distance is performed in both vertical and horizontal directions. Thus, the output controller 17 shifts the image in a direction opposite to that of sway of the image in accordance with the motion vector from the motion vector detecting apparatus so as to cancel sway of the image. Furthermore, the output controller 17 magnifies an original image to an outputted image about 1.1 to 1.5 times as large as the original image and shifts the image in the memory 15 vertically and horizontally such that an edge of the image is invisible when the image is outputted.

Accordingly, even in such a case associated with prior art image stabilizers that sway of a outputted image is corrected erroneously under conditions where a number of points having close correlation in horizontal, vertical or oblique directions are obtained, prospective motion vectors liable to lead to error are invalidated and thus, sway of an outputted image can be corrected stably by the above described arrangement of the image stabilizer 100 including the motion vector detecting apparatus 50 of the present invention.

Meanwhile, in the motion vector detecting apparatus according to the first embodiment of the present invention, only the ratio of the gradients in horizontal and vertical directions and the ratio of the gradients in the oblique directions are described. However, the gradient ratios are not restricted to the above directions. Furthermore, calculation of the gradient of the correlational value is not restricted to that of the first embodiment of the present invention. For example, the gradient may be obtained from an average of differences between the closest correlation (minimum correlational value) at a point and correlational values of opposite points interposing the point therebetween in a direction for obtaining the gradient. Meanwhile, a method of obtaining the gradient ratio GRL is not restricted to that of the embodiment but the gradient ratio GRL may be obtained by passing the signal GR through the low-pass filter.

Moreover, judgement of the gradient ratio is not restricted to that of the first embodiment of the present invention but may be, needless to say, modified variously in accordance with processing conditions.

As is clear from the foregoing description, in the motion vector detecting apparatus according to the first embodiment of the present invention, validity of the motion vectors obtained at the respective detection regions is judged by using gradient ratios obtained by the correlational characteristics extractor at the point having close correlation. B this detection of the gradient ratios by the correlational characteristics extractor, a condition where the erroneous motion vector is detected due to presence of a number of points having close correlation in the image is judged. Then, by suppressing or neglecting the motion vectors obtained at the regions where such condition has been detected, the motion vector of the whole screen displayed by the image signal is obtained.

Therefore, even in such a case associated with prior art motion vector detecting apparatuses that the prospective motion vectors are invalid as the motion vector of the whole screen but the erroneous motion vector is detected due to failure to form a judgement of invalidity, influence of the erroneous motion vector can be eliminated and thus, output of the erroneous motion vector is avoided.

Meanwhile, in the image stabilizer employing the motion vector detecting apparatus of the present invention, sway of the outputted image can be corrected by eliminating influence of the erroneous motion vector obtained under the condition where the erroneous motion vector is outputted due to presence of a number of points having close correlation in the image. Consequently, in accordance with the image stabilizer of the present invention, even in such a case associated with prior art image stabilizers that the prospective motion vectors are invalid as the motion vector of the whole screen due to presence of a number of points having close correlation in the image but the erroneous motion vector is outputted due to failure to form a judgement of invalidity, sway of the outputted image can be corrected properly by eliminating influence of the erroneous motion vector.

Figure 10:
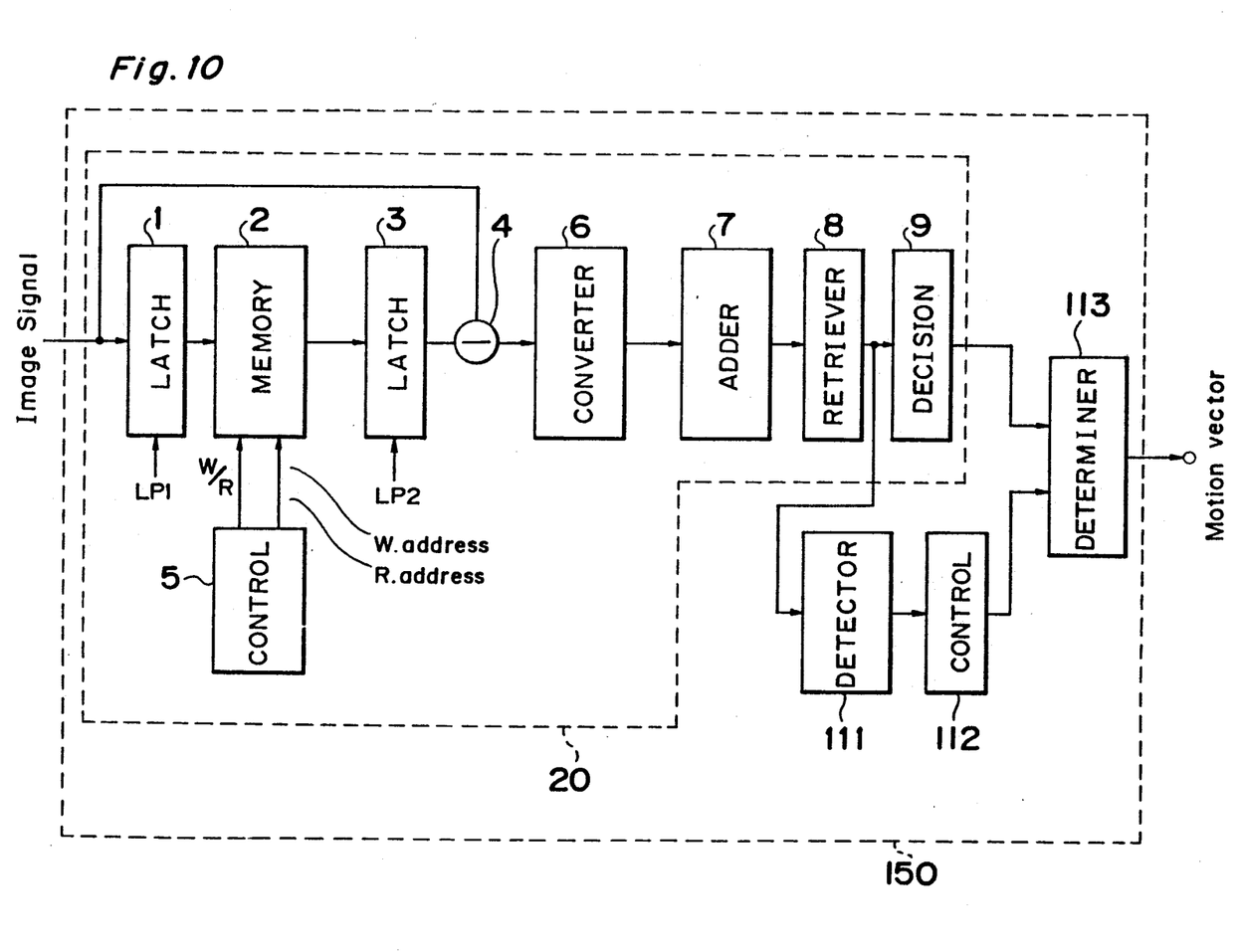
FIG. 10 is a block diagram of a motion vector detecting apparatus according to a second embodiment of the present invention.

FIG. 10 shows a motion vector detecting apparatus 150 according to a second embodiment of the present invention. The motion vector detecting apparatus 150 includes the motion vector detector 20, a motion vector characteristics detector 111, a motion vector controller 112 and a motion vector determiner 113.

As in the motion vector detecting apparatus 50, the correlational decision unit 9 judges whether or not a prospective motion vector obtained by the correlational retriever 8 is valid. Independently of this judgement of validity by the correlational decision unit 9, characteristics of the motion vector are detected by the motion vector characteristics detector 111.

Figure 11:
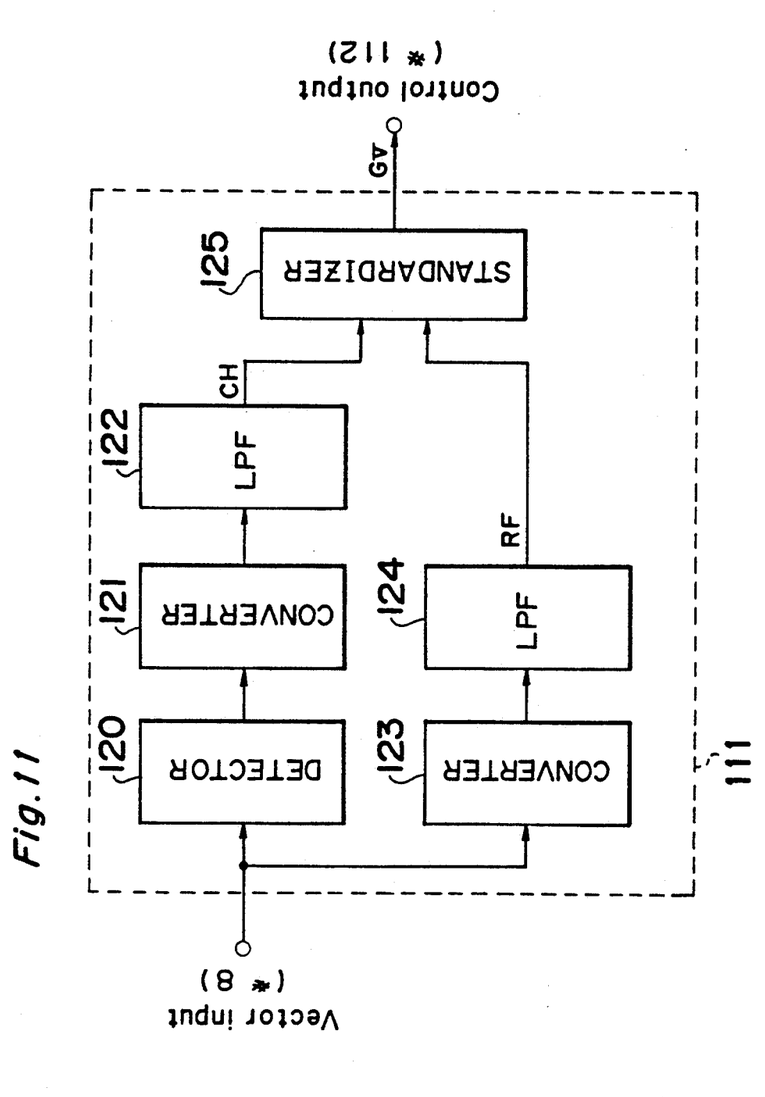
FIG. 11 is a block diagram of a vector characteristics detector employed in the motion vector detecting apparatus of FIG. 10.
Figure 12A:
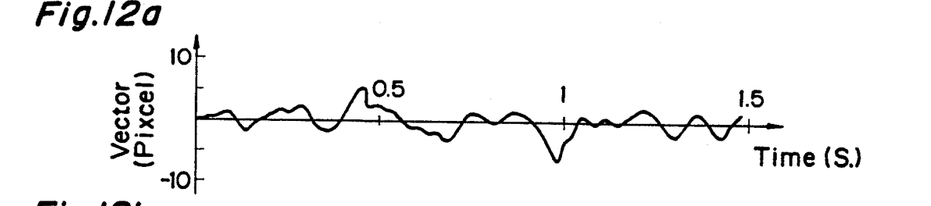
FIGS. 12a to 12d are graphs showing waveform characteristics of motion vectors detected by the motion vector detecting apparatus of FIG. 10.
Figure 12B:
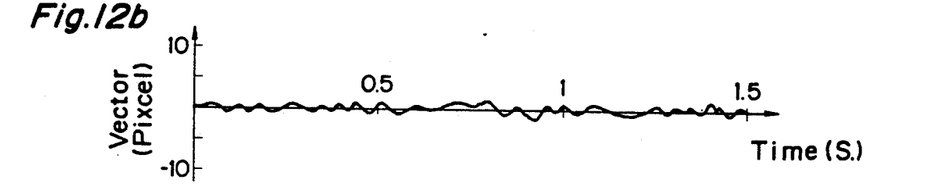
Figure 12C:
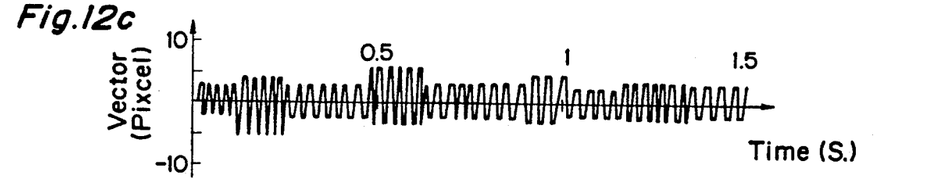
Figure 12D:
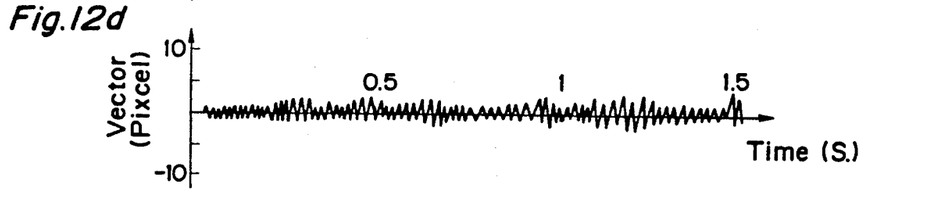

As shown in FIG. 11, the motion vector characteristics detector 111 includes a change detector 120, a first absolute value converter 121, a first low-pass filter 122, a second absolute value converter 123, a second low-pass filter 124 and a standardizer 125. The motion vector characteristics detector 111 of the above described arrangement is operated as follows. The motion vector characteristics detector 111 discriminates characteristics of a motion vector obtained at the time when an image pickup device is held by a hand or a subject is shot from a running motor vehicle, etc. from characteristics of a motion vector obtained at the time when a subject giving a number of points having regular close correlation in an image is shot. FIGS. 12a to 12d show changes of typical motion vectors obtained under these conditions. FIG. 12a shows a horizontal motion vector obtained at the time when an image pickup device is held by a hand, while FIG. 12b shows a horizontal motion vector obtained at the time when a subject is shot from a running motor vehicle, etc. FIGS. 12c and 12d show horizontal motion vectors obtained at the time when a subject giving a number of points having regular close correlation in an image is shot. As shown in FIGS. 12c and 12d, when a subject giving a number of points having close correlation in an image is shot, the obtained motion vector changes sharply a number of times, i.e. at a high frequency. In order to discriminate these conditions from each other, change components of an inputted motion vector are detected by the change detector 120 by using the following equations.

$$S1x\_t(n) = Vx\_t(n-1) - Vx\_t(n)$$

$$S2x\_t(n) = S1x\_t(n-1) - S1x\_t(n)$$

$$S1y\_t(n) = Vy\_t(n-1) - Vy\_t(n)$$

$$S2y\_t(n) = S1y\_t(n-1) - S1y\_t(n)$$

In the above equations, V denotes the motion vector, x and y denote horizontal direction and vertical direction, respectively and t(n) denotes a field in which the motion vector is obtained. In addition, S1 denotes a result obtained in the course of arithmetic operation and S2 denotes a change component of the motion vector. Absolute values of the thus calculated change components of the motion vector are obtained by the first converter 121 and are passed through the first low-pass filter 122 such that sharp changes of the motion vectors are attenuated. Then, a signal CH representing the obtained characteristics of the motion vector is transmitted from the first low-pass filter 122 to the standardizer 125.

At the same time, a reference signal RF for effecting standardization is obtained by the second absolute value converter 123 and the second low-pass filter 124. Namely, an absolute value of the motion vector is obtained by the second absolute value converter 123 and then, is inputted to the second low-pass filter 124 such that sharp changes of the motion vector are attenuated, whereby the reference signal RF is obtained. By using the thus obtained reference signal RF, standardization expressed by the following equation is performed.

$$Gv = A \times CH/(RF+0)$$

In the above equation, A and 0 denote coefficients, respectively. In each system, an optimum value is selected as each of the coefficients A and 0. By performing standardization as described above, it becomes possible to relatively magnify, also under conditions where amplitude of the motion vector is small as shown in FIG. 12d, the level of the motion vector. Thus, the condition of FIG. 12d can be discriminated stably. By using a thus obtained control signal Gv from the standardizer 125, a coefficient by which the motion vector is multiplied is obtained by the motion vector controller 112 such that the motion vector is multiplied by the coefficient.

Figure 13:
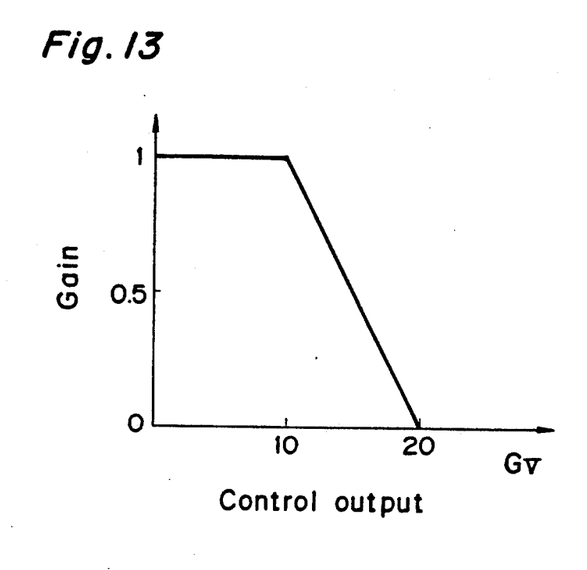
FIG. 13 is a graph showing characteristics of a motion vector controller employed in the motion vector detecting apparatus of FIG. 10.

FIG. 13 shows characteristics of the motion vector controller 112. In FIG. 13, the abscissa represents the output Gv of the motion vector characteristics detector 111, while the ordinate represents value of gain by which the obtained motion vector is multiplied.

Under conditions where the wrong motion vector is detected when output level of the motion vector characteristics detector 111 is high, namely a number of points having regular close correlation exist in an image being shot, it becomes possible to compress the motion vector to zero.

In the same manner as in the motion vector detecting apparatus 50, the prospective motion vectors are, respectively, determined in the divided regions of the screen and then, are passed through a median filter so as to be selected as a motion vector of an inputted signal. Thus, the motion vector of the inputted signal is obtained. Hence, under conditions where a number of points having close correlation exist in the image regularly and the prospective motion vectors are detected erroneously, the prospective motion vectors are set at a magnitude of zero such that the erroneously detected prospective motion vectors are not adopted as the motion vector of the inputted signal. Therefore, also in such a case associated with prior art motion vector detecting apparatuses that the prospective motion vectors are invalid as the motion vector of the inputted signal but an erroneous motion vector is outputted due to failure to form a judgement of invalidity, the erroneous motion vector can be set at a magnitude of zero in the present invention, so that output of the erroneous motion vector is avoided.

Figure 14:
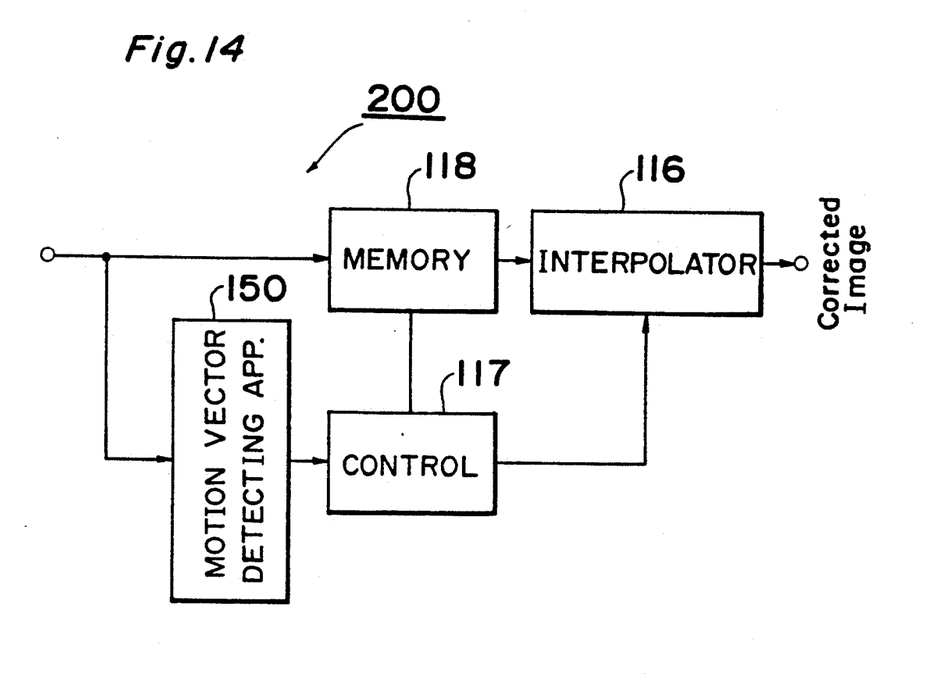
FIG. 14 is a block diagram of an image stabilizer including the motion vector detecting apparatus of FIG. 10, in another aspect of the present invention.

Hereinbelow, an image stabilizer 200 for correcting sway of an outputted image, in another aspect of the present invention is described with reference to FIG. 14. The image stabilizer 200 includes the motion vector detecting apparatus 150, a memory 118 for storing image signals, an interpolator 116 for interpolating signals of the memory 118 and an output controller 117 for controlling the memory 118 and the interpolator 116 on the basis of outputs of the motion vector detecting apparatus 150. Since operation of the image stabilizer is the same as that of the image stabilizer 100, the description thereof is abbreviated for the sake of brevity.

By using the image stabilizer 200 employing the motion vector detecting apparatus 150 of the present invention, under conditions where a number of points having close correlation exist in the image regularly and thus, the erroneous motion vector is detected, the erroneous motion vector is set at a magnitude of zero. Therefore, such a phenomenon can be obviated that the erroneously detected motion vector is used for correction of sway of the outputted image. Consequently, even in such a case associated with prior art image stabilizers that the prospective motion vectors are invalid as the motion vector of the inputted signal due to regular presence of the points having close correlation in the image but sway of the outputted image is corrected erroneously due to detection of the erroneous motion vector caused by failure to form a judgement of invalidity, the erroneously detected motion vector can be set at a magnitude of zero in the present invention and thus, erroneous correction of sway of the outputted image can be eliminated.

Figure 15:
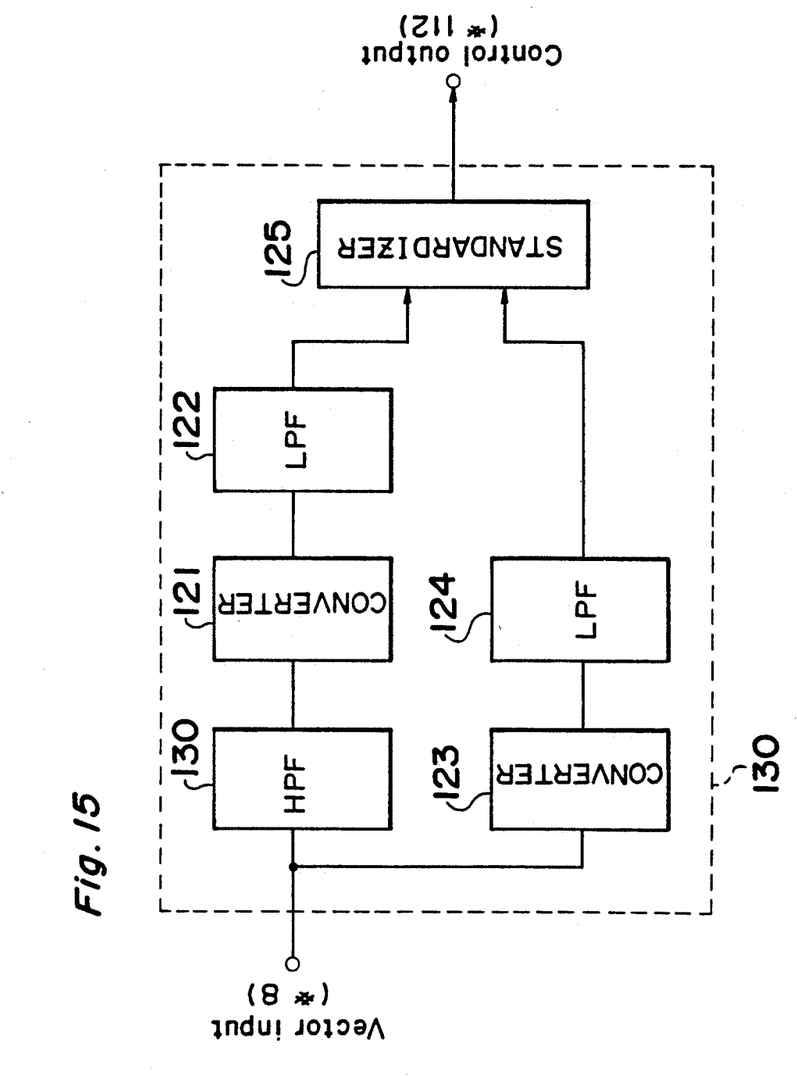
FIG. 15 is a view similar to FIG. 11, particularly showing a modification thereof.

Meanwhile, in the motion vector detecting apparatus 150, the motion vector characteristics detector 111 of FIG. 11 may be modified to a motion vector characteristics detector 130 as shown in FIG. 15. In the motion vector characteristics detector 130, the change detector 120 is replaced by a high-pass filter 130. It is desirable that the cut-off frequency of the high-pass filter 130 ranges from 5 to 15 Hz.

Furthermore, in the motion vector detecting apparatus 150, arithmetic method of the motion vector characteristics detector 111 is not restricted to that of the second embodiment of the present invention and may be, needless to say, replaced by any other similar method suited for the purpose of the present invention.

Meanwhile, in the motion vector detecting apparatus 150, the motion vector is standardized on the basis of the magnitude of the motion vector but it goes without saying that any other method may be employed for standardization In order to simplify processing, it is possible to eliminate the standardizer 125.

As is seen from the foregoing, in the motion vector detecting apparatus according to the second embodiment of the present invention, conditions where a number of points of a subject have close correlation and the obtained motion vector changes sharply are detected by the motion vector characteristics detector. By this detection of the conditions by the motion vector characteristics detector, a condition where the erroneous motion vector is detected due to presence of a number of points having regular close correlation in the image is judged. Then, by suppressing or neglecting the motion vectors obtained at the regions where such condition has been detected, the motion vector of the whole screen displayed by the image signal is obtained.

Accordingly, in the motion vector detecting apparatus according to the second embodiment of the present invention, output of the erroneous motion vector can be eliminated by eliminating influence of the erroneous motion vector. Therefore, an accurate motion vector can be obtained under any condition.

Furthermore, in the image stabilizer employing the motion vector detecting apparatus according to the second embodiment of the present invention, sway of the outputted image can be corrected properly by eliminating influence of the erroneous motion vector.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A motion vector detecting apparatus comprising:
    a motion vector detector which divides an image of an inputted image signal into a plurality of regions each having a plurality of image points, and which calculates respective motion vectors based on the image points within the plurality of regions;
    a characteristics detector for determining at least one predetermined characteristic of each of the respective motion vectors of the plurality of regions, or of calculation data of the respective motion vectors of the plurality of regions, so as to detect a state for each region in which a number of image points exhibit a close correlation relative to one another in the image; and
    a vector control and decision unit which determines when said characteristics detector has detected the state, an overall motion vector of the inputted image signal based on selected motion vectors from at least one of the regions in which the state is not detected by said characteristics detector and by neglecting the motion vectors from the regions in which the state is detected by said characteristic detector.

2. A motion vector detecting apparatus as claimed in claim 1, wherein said characteristics detector detects as the state a condition in which said close correlation exists in horizontal and vertical directions or oblique directions among the image points of each region in the image.

3. A motion vector detecting apparatus as claimed in claim 1, wherein said characteristics detector detects as a characteristic that one of the motion vectors changes at random in one of the regions when a number of image points having said close correlation exist in the image such that said vector control and decision units reduces, when said characteristics detector has detected the characteristic in the one of the regions, a magnitude of the one of the motion vectors.

4. An image stabilizer for correcting sway of an image, comprising:

a motion vector detector which divides an image of an inputted image signal into a plurality of regions each having a plurality of image points, and which calculates respective motion vectors based on the image points within the plurality of regions;

a characteristics detector for determining at least one predetermined characteristic of each of the respective motion vectors of the plurality of regions, or of calculation data of the respective motion vectors of the plurality of regions, so as to detect a state for each region in which a number of image points exhibit a close correlation relative to one another in the image; and a vector control and decision unit which determines when said characteristics detector has detected the state, an overall motion vector of the inputted image signal based on selected motion vectors from at least one of the regions in which the state is not detected by said characteristics detector and by neglecting the motion vectors from the regions in which the state is detected by said characteristic detector; and an image output controller for interpolating the image so as to be capable of outputting the image disposed at an arbitrary position;

wherein when said motion vector detector has detected sway of the image, said image output controller shifts the image in a direction opposite to that of the motion vector determined by said vector control and decision unit.

5. An image stabilizer as claimed in claim 4, wherein said characteristics detector detects as the state a condition in which said close correlation exists in horizontal and vertical directions or oblique directions among the image points of each region in the image.

6. An image stabilizer as claimed in claim 4, wherein said characteristics detector detects as a characteristic that one of the motion vectors changes at random in one of the regions when a number of image points having said close correlation exist in the image such that said vector control and decision units reduces, when said characteristics detector has detected the characteristic in the one of the regions, a magnitude of the one of the motion vectors.

* * * * *